United States Patent [19]

Wowczyk

[11] 3,952,400

[45] Apr. 27, 1976

[54] METHODS FOR CUTTING ALIGNED NOTCHES IN PARALLEL WOODEN FRAME MEMBERS

[76] Inventor: Hans J. Wowczyk, 2 N. Atlas Ave., Thousand Oaks, Calif. 91360

[22] Filed: Mar. 13, 1975

[21] Appl. No.: 558,062

Related U.S. Application Data

[62] Division of Ser. No. 492,404, July 29, 1974.

[52] U.S. Cl. .................................... 29/432; 29/428; 29/445; 52/741; 83/483; 83/745; 144/136 R; 144/309 L; 144/318; 144/323

[51] Int. Cl.[2] ..................... B21D 39/03; B23P 11/00

[58] Field of Search .......... 29/428, 445, 432, 432.1; 83/745, 522, 486, 483, 471.3, 454; 52/693, 741; 144/136, 133, 309 R, 313, 319, 321, 323, 326, 318, 309 L

[56] References Cited

UNITED STATES PATENTS 3,851,372 12/1974 Wirch .............................. 144/309 L

*Primary Examiner*—Donald R. Schran
*Assistant Examiner*—W. D. Bray
*Attorney, Agent, or Firm*—William P. Green

[57] ABSTRACT

A portable tool and method for connecting a cross piece to a series of parallel boards in a wooden frame assembly, by connecting a guide member temporarily to outer coplanar faces of the boards, directing the tool along the guide member and across those board faces to cut aligned similar notches therein, and then removing the guide member and connecting it or another member into the notches as a cross piece interconnecting the boards. To perform the notching action effectively, the tool has a first guide surface which engages and moves across the outer faces of the boards, with a cutter projecting inwardly beyond the plane of those faces to cut the desired notches, and with two additional guide surfaces engaging a lateral edge and outer face respectively of the guide member to positively locate and position the tool as it moves across the boards and forms the notches.

2 Claims, 6 Drawing Figures

FIG. 4.

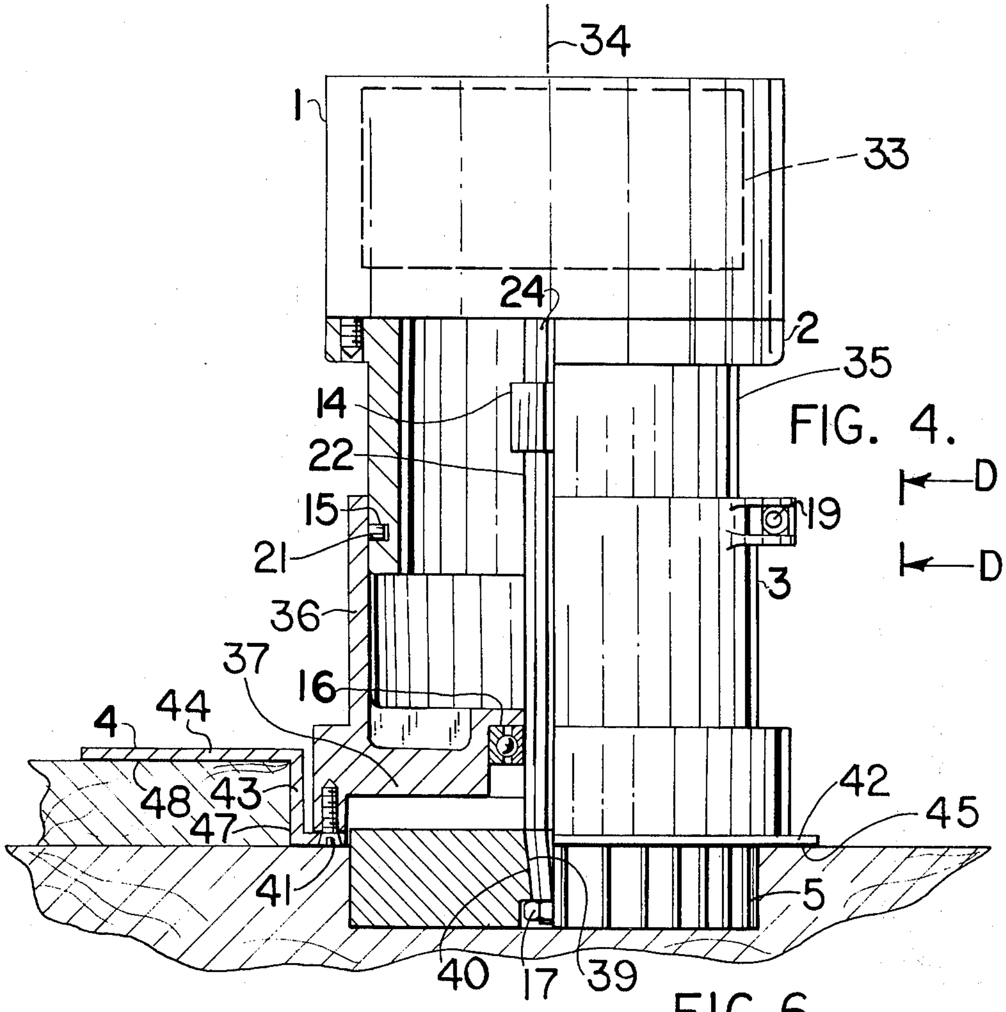
FIG. 4.
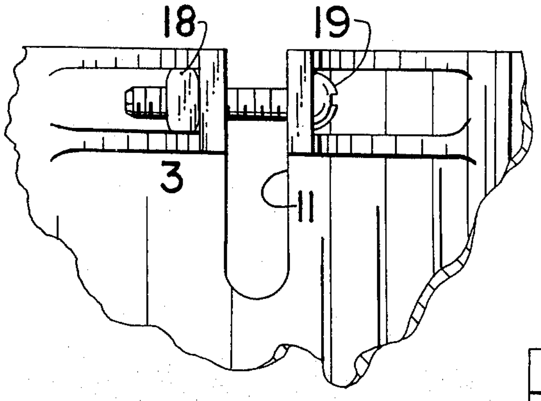
FIG. 5.
FIG. 6.
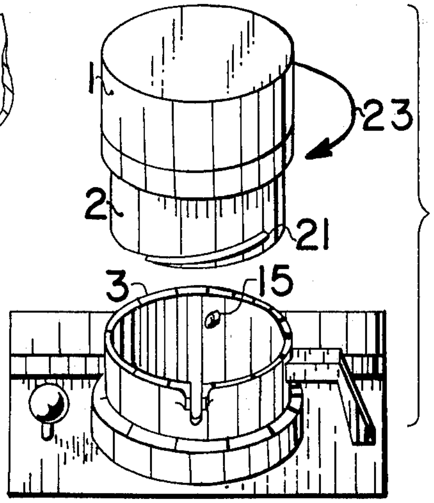

METHODS FOR CUTTING ALIGNED NOTCHES IN PARALLEL WOODEN FRAME MEMBERS

This is a division of application Ser. No. 492,404, filed July 29, 1974.

BACKGROUND OF THE INVENTION

This invention relates to improved portable power tools and methods for forming wooden frame assemblies for a building or the like. Certain features of the invention have been shown and described in my disclosure document Ser. No. 012,502 entitled "Automatic Brace Cutter" filed July 31, 1972 in the U.S. Patent Office.

In constructing a wooden frame building, it is conventional to connect diagonal cross braces to the studs of the various walls of the building, in order to very positively retain the studs in a proper position of parallelism with respect to one another, and in accurately perpendicular relationship with respect to the top plates and lower mudsill of the wall. To avoid interference by the cross braces with the application of wall board or other wall covering to the outer faces of the wooden studs, diagonal aligned notches are cut in the studs to a depth enabling reception of the cross brace within the notches in a 'let-in' relation avoiding projection of the cross braces outwardly beyond the plane of the outer faces of the studs.

The conventional method utilized by carpenters in the construction industry for forming such notches in a series of studs to receive a cross brace requires the formation of three separate cuts with a portable circular saw in each stud, to form each individual notch. Specifically, two parallel diagonal cuts are first formed at spaced locations in an edge of the stud, to form opposite sides of the notch, and then a third cut extending between and perpendicular to these first two cuts is made at a location to form the inner wall of the notch. The exact dimensions and positions of these cuts and the resultant notches are of course extremely critical, since the notches must be both large enough to accept the brace and small enough for a snug fit.

This conventional prior art method of forming the brace notches has several drawbacks. In the first place, the three marking and cutting operations which must be performed on each stud in carrying out this process require the expenditure of a considerable amount of time in notching each stud, and as a result needlessly increase the cost of forming and assembling a wall frame. Further, if any of the three cuts is not formed at precisely the right location, or to a great enough depth, the notch may not be large enough to receive the brace, and it may be necessary to recut the stud to a larger size. If the notch is made slightly too deep or too wide, the completed wall frame may have less than the designed structural strength by virtue of a failure of the brace to fit snugly into and be confined closely within the notch.

SUMMARY OF THE INVENTION

The general purpose of this invention is to provide an improved method and apparatus for more efficiently and effectively cutting notches of the discussed general type in a series of parallel studs or other similar parallel framing boards, for reception of a let-in brace or other cross piece interconnecting the boards. To achieve this result, I employ a portable hand tool having a powered cutter or cutter means properly shaped and dimensioned to cut aligned similar notches of the desired predetermined cross section in a series of parallel studs or boards in one operation. Prior to this cutting operation, an elongated guide member is connected to the parallel boards in a position of extension across their outer coplanar edge faces, and at an angle corresponding to that at which the cross brace is to extend. The tool is moved into contact with the guide member, and advanced therealong to form the properly aligned notches in the different studs. After the notches have been formed in this manner, to precisely predetermined dimensions and in precisely controlled alignment with one another, the temporary guide member is detached from the parallel boards, and a cross piece is connected into the notches in snugly fitting and closely confined relation therein. Preferably, the same board which is utimately to serve as the brace or other cross piece is itself utilized as the temporary guide member during the notching operation.

To enable its use in this manner, the portable power tool is provided with a unique arrangement of guide surfaces, for contacting the guide member and studs in an accurately locating relation, and at the same time allowing projection of the cutter means of the tool to a proper position relative to the guide surface for cutting the desired notches in the studs. More particularly, the tool has a first guide surface for engaging the outer coplanar faces of the studs, with the cutter or cutters projecting inwardly beyond the plane of that surface for cutting notches in the studs. In addition, the tool has a second guide surface engageable laterally against the temporary guide member, and a third guide surface facing in generally the same direction as the first guide surface and engageable with an outer surface of the elongated temporary guide member. Both of the second and third guide surfaces are offset from the plane of the first guide surface in a direction away from the boards which are being notched, that is, in a direction which is the opposite of the direction in which the cutter means project beyond the first guide surface. The increased accuracy in the dimensioning and placement of the notches over the prior three-cut method virtually eliminates the problems heretofore encountered in properly fitting a brace to a series of studs, and very substantially increases the shear value of the ultimate wall structure. The close fit of the brace or other cross piece within the stud notches enables the edges of the brace to abut directly against the walls of each notch in a manner preventing any substantial relative movement between the brace and studs. Further, when the brace is itself initially used as the temporary guide member, as discussed, the result is an extremely convenient and practical overall process eliminating the necessity for use of a separate guide or marking mechanism of any type, and in addition attaining the further result of directing the cutting tool along a path following any gradual curvature which a particular brace board may have.

As will be apparent from the present disclosure, the novel apparatus and method of the invention may also have application in other situations encountered in the construction industry, in which cross pieces other than 'let-in' braces are to be attached to other parallel board assemblies. For example, notches may be formed in accordance with the invention for mounting 'let-in' ribbons for 'balloon framing', or in forming seat cuts in rafters; or the invention may be utilized for forming notches in the outer edges of studs for receiving gas or water piping. To simplify and clarify the present disclosure, the invention will be described primarily as applied to the discussed 'let-in' brace structures.

BRIEF DESCRIPTION OF THE DRAWINGS

The above and other features and objects of the invention will be better understood from the following detailed description of the typical embodiment illustrated in the accompanying drawings, in which:

FIG. 4 is an enlarged view, partially in section and partially in elevation, taken primarily on line C—C of FIG. 1;

FIG. 5 is a further enlarged fragmentary view taken on line D—D of FIG. 4; and

FIG. 6 is an exploded perspective view showing two sections of the tool body separated from one another, with the cutter removed from the device.

DESCRIPTION OF THE PREFERRED EMBODIMENT

Figure 1:
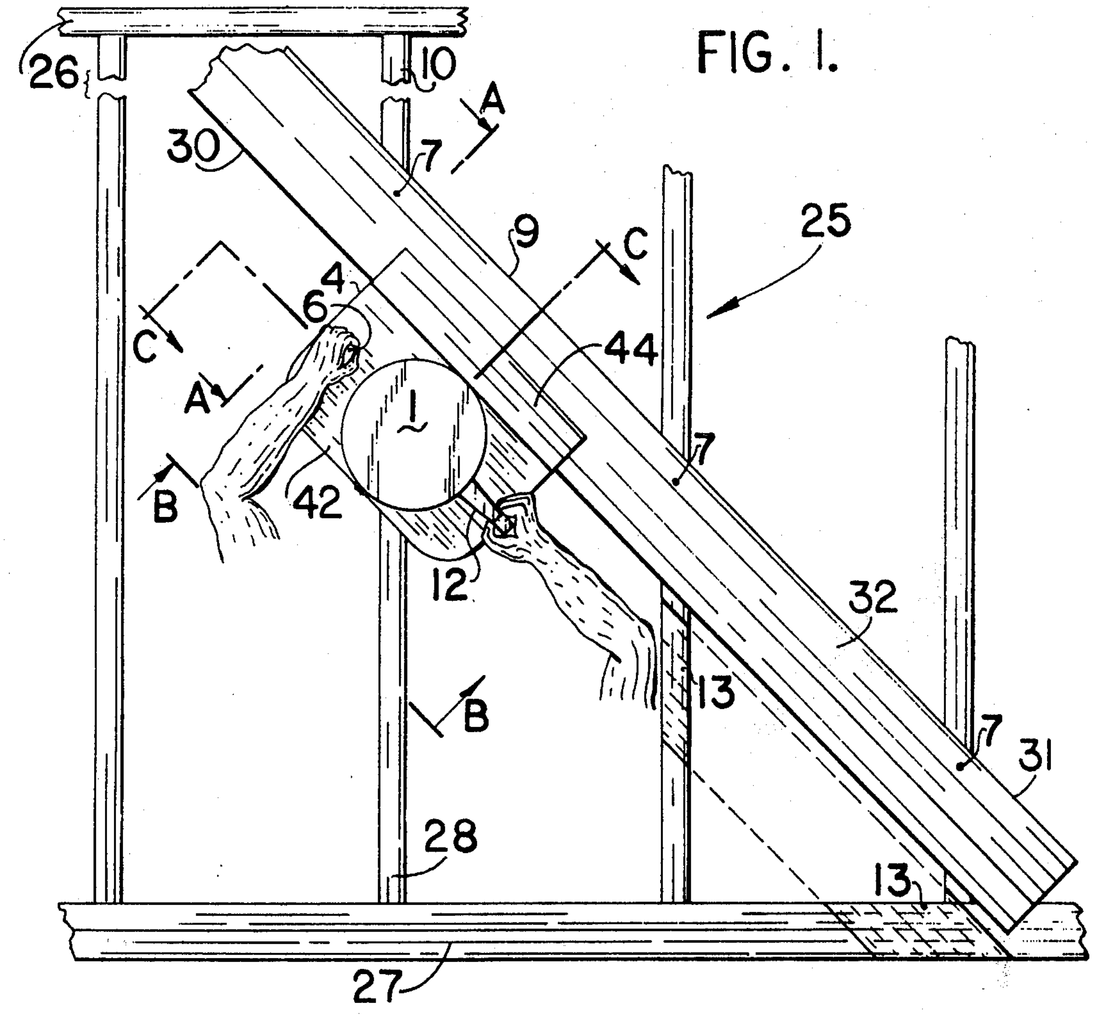
FIG. 1 is a plan view of a portable power tool constructed in accordance with the invention, shown as it appears when cutting a series of aligned notches in the studs of a wall frame.

Referring first to FIG. 1, there is represented at 25 the framing for a wall of a conventional wooden frame building, including a series of elongated parallel wooden studs 10 which are spaced laterally apart and extend vertically in the ultimate upstanding condition of the wall. Connected to a first end of the studs is a transverse mudsill 26, which ultimately forms the bottom of the wall, and connected to the second end of the studs are a pair of top plates 27. All of these boards 10, 26 and 27 may be of the usual nominal 2-inch by 4-inch cross section.

Figure 2:
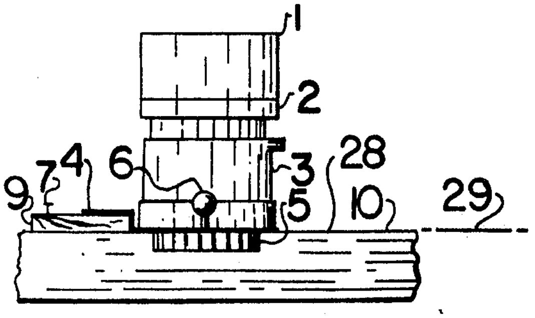
FIG. 2 is a front elevational view of the tool taken on line A—A of FIG. 1.
Figure 3:
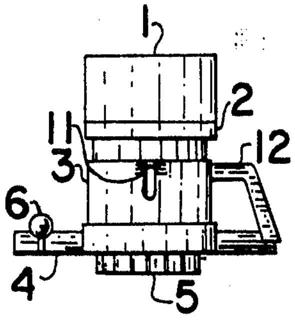
FIG. 3 is a side elevational view of the tool taken on line B—B of FIG. 1.

To maintain these studs in their desired parallel relation, a brace 9 is to be connected to the studs in a diagonal position with respect thereto, and is to be received within aligned diagonal notches 13 formed in the studs, mudsill, and top plates. The studs have outer planar edge faces 28, which lie in a common plane 29 extending across one side of the frame structure. The notches 13 are cut into these surfaces (FIG. 2), and have depth and width dimensions corresponding to the thickness and width of cross brace 9. During formation of the notches, brace 9, is secured temporarily to faces 28 of the studs, as by nails represented at 7, at a location offset from the desired location at which notches 13 are to be formed, and acts as a guide member for directing a portable cutting tool 1 along a proper path for forming the notches. The brace member 9 is of uniform cross section along its entire length, having two parallel opposite side edges 30 and 31, an upper planar surface 32, and an under surface (not visible in FIG. 1) disposed parallel to and spaced beneath upper surface 32.

In FIG. 1, it may be assumed that the studs, mudsill and top plates have been connected together as a frame assembly, but have not yet been swung to an upstanding position. Instead, this frame may be disposed horizontally on a ground or floor surface, for formation of the notches 13.

To describe now the structure of the power tool 1, this tool may typically include a body structure formed of two relatively adjustable sections 2 and 3, which for clarity are illustrated in FIG. 6 in their separated condition. The upper of these sections, number 1, contains a typically electrical motor 33, having a driven shaft 24 turning about the axis designated 34 in FIG. 4. A downwardly projecting cylindrical mounting sleeve 35 of this upper housing section number 2 is telescopically receivable within an upwardly projecting cylindrical hollow portion 36 of the lower section 3 of the body. Motor shaft 24 is connected by a coupling 14 to a shaft extension 22, which is journaled within a ball bearing 16 formed in a transverse bottom wall 37 of body section 3 for rotation with a carried routing cutter 5 about the mentioned axis 34. The cutter may be detachably connected to shaft 22 by means of a nut 17 threadedly connected onto the lower end of the shaft and tightening a conically recessed proportion 39 of the cutter upwardly against an externally tapering lower portion 40 of the shaft.

For adjusting upper body section 1 and the cutter upwardly and downwardly relative to lower section 3, portion 35 of upper section 1 may contain a helically advancing groove 21, into which a radially inwardly projecting pin 15 carried by side wall 36 of the lower section 3 projects, in a relation causing axial vertical movement of section 1 relative to section 2 in response to their relative rotary movement. The two sections can be locked in any fixed position by tightening of a screw 19 (FIG. 5) relative to a threadedly engaged nut 18, to reduce slightly the width of a slot or groove 11, formed in wall 36, and thereby constrict wall 36 inwardly against and into frictional locking engagement with wall 35.

The invention is in certain respects primarily concerned with the provision of a unique guiding structure 4 connected to the lower end of the body of the tool. In the illustrated preferred arrangement, this guide structure 4 is formed of a single piece of rigid sheet metal secured to the underside of body section 3 by the number of circularly spaced screws 41. This sheet metal is deformed to have three guiding portions 42, 43 and 44. The first of these portions, number 42, is disposed transversely of axis 34, and has the essentially rectangular peripheral outline shape illustrated in FIG. 1. At its upper side, this portion 42 may carry two handles designated by the numbers 6 and 12 in the figures, to enable a user to grasp the tool and manipulate it in the manner illustrated in FIG. 1. At its underside, portion 42 of guide part 4 has a planar under surface 45, which in the FIG. 2 cutting position of the tool lies in the plane 29 of the upper or outer surfaces 28 of studs 10. This guide surface 45 thus engages stud surfaces 28 in a manner locating the tool relative to surfaces 28 and against movement downwardly in FIG. 2 from the illustrated proper notch cutting position. Surface 45 preferably extends completely about cutter 5, in close proximity to its peripheral cutting edges (as seen in FIG. 4). The cutter is dimensioned to cut a notch just slightly wider than brace board 7, to closely receive the brace board in the final assembly step. Also, cutter 5 has a depth beneath guide surface 45 just slightly greater than the thickness of brace board 7, to properly receive the entire thickness of that board without projection of the brace upwardly beyond the plane of surfaces 28 of the studs. It is further noted that preferably no portion of guide structure 4, or the body of the tool, or any other part of the device other than cutter 5 itself, projects downwardly beyond plane 29.

The second portion 43 of guide part 4 extends perpendicularly to the first portion 42, to present a second planar guide surface 47, disposed perpendicular to the first guide surface 45 and to its guiding plane 29. At its upper end in FIG. 4, this second portion 43 merges with and carries a final portion 44 of guide part 4, which is turned at right angles to portion 43 to present a third planar guide surface 48, disposed parallel to plane 45 but spaced upwardly above that plane. Thus, both of the guide surfaces 47 and 48 are offset from plane 29 in an axial direction the opposite of that in which cutter 5 projects relative to plane 29.

To now describe a cycle of use of the tool, assume that the boards 10, 26, and 27 have been connected together in the manner illustrated in FIG. 1, and that this wooden frame structure has been placed in horizontal position on a ground or floor surface. A user then cuts the brace board 7 to a proper length for extension diagonally across a number of the studs, with opposite ends of the brace board crossing the mudsill and top plates respectively. The brace board is then nailed to the studs in a diagonally extending position such as that shown in FIG. 1, to retain the studs in parallel condition, and to serve as a temporary guide located above and engaging the upper or outer surfaces 28 of the studs. The operator then grasps the tool as shown in FIG. 1, and moves it to a position in which the first guide surface 45 engages the upper or outer surfaces 28 of the studs and/or top plates and/or mudsill. Guide surface 47 is moved into engagement with the planar edge surface 30 of brace board 7, while guide surface 48 is moved into position against the outer face 32 of the brace. With the tool held in this position, it is advanced progressively along brace 7 and the upper or outer surfaces of the studs, being guided along a straight path by the various guide surfaces. As the cutter passes each of the studs or the top plates or the mudsill, the rapidly rotating cutter 5 with projects beneath plane 29 cuts notches 13 in these various boards. By virtue of the controlled guiding of the tool as discussed, all of these notches are very precisely aligned with one another, and are formed at precisely the same width and precisely the same depth in each board. After the tool has been moved along the entire length of the brace in this manner, and all of the notches have been formed, the brace 7 is removed from its initial temporary position of connection to the studs, and is placed in the formed notches, and then nailed in place to each of the notched boards. The ends of the brace may be cut off in correspondence with the outer faces of the top plates and mudsill, to complete the assembly. The resultant frame structure may then be swung to a vertical position, and be secured in that position, with wall boards and/or other covering materials applied to the opposite faces 28 of the studs and corresponding faces of the top plates and mudsill to complete the wall.

While a certain specific embodiment of the present invention has been disclosed as typical, the invention is of course not limited to this particular form, but rather is applicable broadly to all such variations as fall within the scope of the appended claims.

I claim:

1. The method that comprises:

positioning a series of boards in parallel relation with outer similar faces of said boards lying in a common plane;

temporarily connecting an elongated guide member to said boards in a position of extension across said outer faces thereof in close proximity to said faces;

moving a portable power driven cutting tool into engagement with said guide member and directing said tool along a path parallel to said guide member and across said faces of the boards by engagement with the guide member;

cutting aligned similar notches of predetermined cross section in said series of boards by said tool as the latter is advanced along said guide member;

removing said guide member from said position of extension across said outer faces of said boards; and connecting said guide member to said boards in a position of extension thereacross and reception within said similar notches of the different boards.

2. The method as recited in claim 1, in which said guide member when temporarily connected to said boards is disposed at an oblique angle to the boards, to form said notches at a corresponding oblique angle.

* * * * *